United States Patent
Li et al.

(10) Patent No.: US 9,806,555 B2
(45) Date of Patent: Oct. 31, 2017

(54) PEER TO PEER SELF-OPTIMIZING RESONANT INDUCTIVE CHARGER

(71) Applicant: VERIZON PATENT AND LICENSING INC., Arlington, VA (US)

(72) Inventors: Yuk Lun Li, Morganville, NJ (US); Eugene Young, New York, NY (US); Nanjun Qian, Princeton, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 284 days.

(21) Appl. No.: 14/324,780

(22) Filed: Jul. 7, 2014

(65) Prior Publication Data
US 2016/0006291 A1    Jan. 7, 2016

(51) Int. Cl.
| H02J 7/00 | (2006.01) |
| H01F 27/42 | (2006.01) |
| H02J 7/02 | (2016.01) |
| H02J 50/40 | (2016.01) |

(52) U.S. Cl.
CPC .............. *H02J 7/025* (2013.01); *H02J 50/40* (2016.02); *H02J 7/007* (2013.01)

(58) Field of Classification Search
CPC . Y02E 60/12; H02J 7/025; H02J 5/005; H02J 17/00; H01F 38/14; Y02T 90/122; Y02T 10/705; Y02T 10/7005; Y02T 10/7008; Y02T 90/14; B60L 11/182

USPC .......................................... 320/108; 307/104
See application file for complete search history.

(56) References Cited

U.S. PATENT DOCUMENTS

| 8,805,456 | B1* | 8/2014 | Hardy | H02J 7/025 |
| | | | | 455/41.1 |
| 2008/0218314 | A1* | 9/2008 | Van Eeden | G06K 19/0701 |
| | | | | 340/10.1 |
| 2011/0270462 | A1* | 11/2011 | Amano | H02J 5/005 |
| | | | | 700/297 |
| 2012/0225622 | A1* | 9/2012 | Kudrna | H04M 1/0256 |
| | | | | 455/41.2 |
| 2012/0235636 | A1* | 9/2012 | Partovi | H02J 7/025 |
| | | | | 320/108 |
| 2013/0088192 | A1* | 4/2013 | Eaton | G06F 1/266 |
| | | | | 320/108 |
| 2013/0091225 | A1* | 4/2013 | Eaton | H02J 7/025 |
| | | | | 709/206 |
| 2014/0021795 | A1* | 1/2014 | Robertson | H01F 38/18 |
| | | | | 307/104 |
| 2014/0035379 | A1* | 2/2014 | Stevens | H02J 7/0013 |
| | | | | 307/104 |
| 2014/0132208 | A1* | 5/2014 | Fisher | H02J 7/025 |
| | | | | 320/108 |
| 2015/0123465 | A1* | 5/2015 | Ichikawa | B60L 11/14 |
| | | | | 307/9.1 |

* cited by examiner

*Primary Examiner* — Richard Isla Rodas
*Assistant Examiner* — Mohammed J Sharief (57) ABSTRACT

Inductive wireless charging for mobile devices are described that utilize resonant inductive coupling between a wireless inductive charging device and the battery of the mobile device. The power transfer from the charging device to the mobile device is adjustable. Signals are sent between the devices to determine power transfer efficiency and to adjust settings to approach or achieve a desired target efficiency.

20 Claims, 7 Drawing Sheets

PEER TO PEER SELF-OPTIMIZING RESONANT INDUCTIVE CHARGER

BACKGROUND

In recent years, wireless mobile devices, such as cell phones, smart phones, laptops, and tablet computers are widely used. They are typically powered by power cells that are rechargeable (e.g., batteries). Such wireless mobile devices are usually provided with a wired charging mechanism, such as a wall plug, for transferring power to the battery. The wired charging connections have become increasingly smaller and fragile. Additionally, as the number of mobile devices commonly used by one person increases, and the constant use of the mobile devices on the go, availability of power outlets to charge the batteries has become limited and problematic.

Although they may offer other functions, such as data communication, docking stations also provide electrical connectivity for charging of a portable electronic device, such as a mobile device. A docking station typically has an electrical connector for electrical connection to a mating connector of the mobile device, for charge transfer and possibly for transfer of other signals. The connectors vary as between different types of mobile devices. Even for a type of device from one manufacturer, the connectors may vary between newer and older models, or the like. The connector in a docking station that is compatible with one device often is not compatible with another device, which limits the applicability of the docking station.

Recently developed mobile device accessories have included inductive chargers, offered as an alternative to corded battery chargers and docking stations with electrical connectors. Inductive chargers wirelessly provide electrical charge to chargeable devices, via a coil in the charger and a corresponding coil in the portable device. In some examples, the charger takes the form of a pad on which one or more such chargeable devices may rest while charging. Any device with a coil and a battery charging circuit that can be driven by alternating current signals from the coil may be able to work with the inductive charger. Such inductive charging accessories have several limitations. The charging range is very limited, usually restricting the distance between the mobile device and the charging pad to be no more than several millimeters, and, in some instances, require the accessory to be in physical contact with the docking station. These limitations often prevent the mobile devices from being used and restrict movement of the mobile devices while the battery is charging.

Hence a need exists for mobile device battery chargers that do not require a wired connection to the mobile device and are capable of wirelessly charging multiple devices over wider positional ranges, allowing greater freedom of positioning between the devices and the chargers and permitting ease of use of the devices while the batteries are wirelessly charging.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various systems, methods, and devices disclosed herein relate to wirelessly charging a battery of a mobile device with resonant inductive coupling between a wireless inductive charging device and the battery of the mobile device, where the power transfer from the charging device to the battery is adjustable to be of an efficiency to support charging of the battery. Utilizing resonant inductive coupling according to the disclosed examples allows for greater freedom of positioning between the mobile device and the charging device, while providing ease of use of the mobile device during charging and maintaining power transfer efficiency for effective charging of the battery.

Figure 1A:
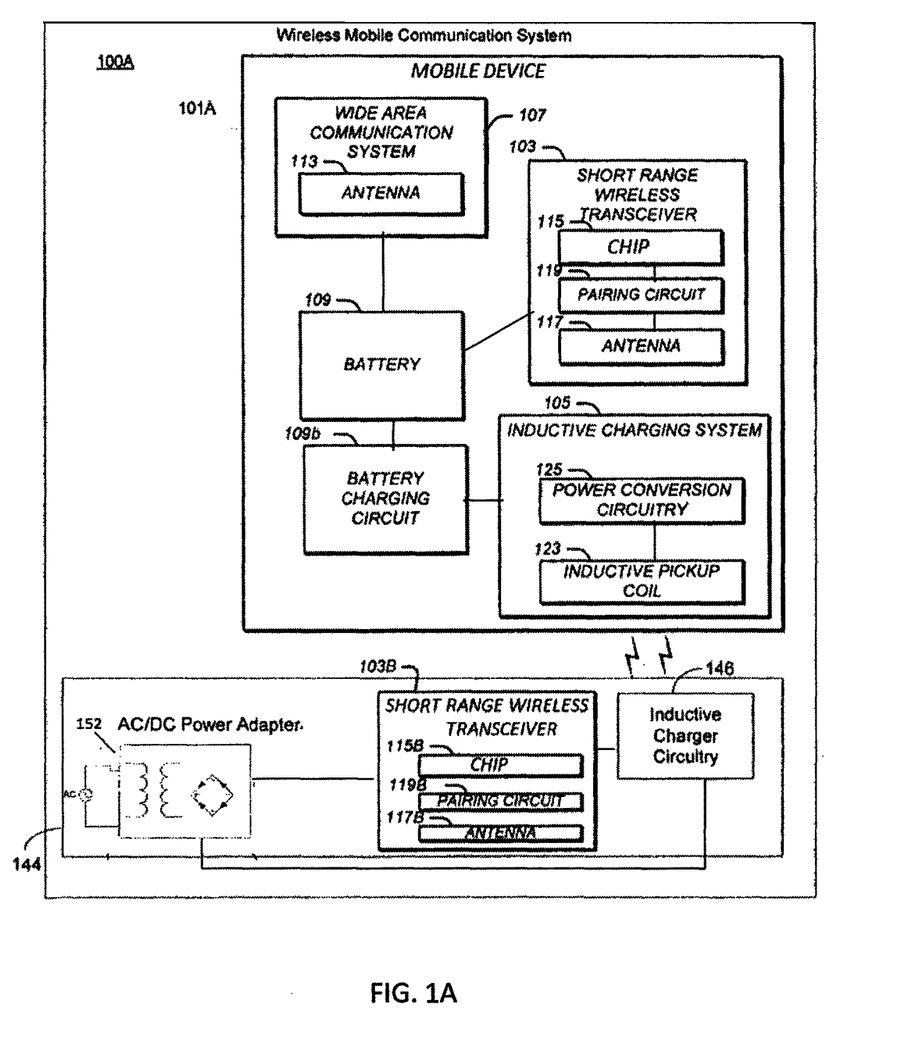
FIGS. 1A and 1B are functional diagrams of examples of mobile devices and wireless inductive charging devices.

Reference now is made in detail to the examples illustrated in the accompanying drawings and discussed below. FIG. 1A illustrates an example of a wide area communication system 100A including a mobile device 101A and a wireless inductive charging device 144.

The mobile device 101A includes an inductive charging system 105 for resonant inductive coupling with the charging device 144. The inductive charging system 105 may be integrated to the mobile device 101A as shown in the example or externally attached to the mobile device 101A. The mobile device 101A also includes a short range wireless transceiver 103 (e.g., Bluetooth, WiFi, ZigBee, etc.) for short range data communications with other devices, such as a compatible transceiver 103B in the wireless inductive charging device 144. As illustrated in FIG. 1A, the mobile device 101A also includes a battery 109, and a battery charging circuit 109b. Device electronics, such as the short range wireless transceiver 103 and a wide area communication system 107, are powered by the battery 109 and/or by the charging circuit 109b during charging. The battery and/or charging circuit may provide power to other device electronics not shown.

The wide area communication system 107 configures the mobile device 101A to communicate wirelessly over a public or wide area communication network, such as a public cellular network (not shown). The mobile device 101A may be of any type. For example, the mobile device may include a cell phone, a smart phone, a laptop computer, a tablet computer, a portable gaming device or media player with communication capability, etc.

The wide area communication system 107 is configured to communicate wirelessly over a communication network, such as a cellular communication network or WiFi. The wide area communication system 107 includes an antenna 113 configured to facilitate the wireless transmission and reception of signals that carry the communication to/from the wide area network. The wide area communication system 107 also includes a user interface to facilitate receiving and sending the communications. The user interface may include a display, a touch screen, a keyboard, a pointing device, a microphone, a loudspeaker, and/or any other type of user interface device. The wide area communication system 107 may also include a processing system configured to process the communications, which may include an operating system and one or more application programs (e.g., software).

The short range wireless transceiver 103 is configured to exchange data over short distances. For example, if the wide area communication system 107 supports cellular communication, the short range wireless transceiver 103 may be a WiFi, Bluetooth, and/or Zigbee transceiver. If the wide area communication system 107 supports WiFi communication, the short range wireless transceiver 103 may be a Bluetooth, Zigbee and/or near field communication (NFC) transceiver. For purposes of further discussion of specific examples, we will assume that the wide area communication system 107 is a cellular transceiver, for example, for 3G and 4G type communications via public mobile communications networks.

In a Bluetooth example, the short range wireless transceiver 103 exchanges data over short distances using short wavelength radio transmissions in the ISM band from 2400-2480 MHz with low power consumption. For example, class 1 Bluetooth uses 100 mW of power to cover a communication range of approximately 100 m; class 2 Bluetooth uses 2.5 mW for 10 m, and class 3 Bluetooth requires less than 1 mW for a range of 5 m. The mobile device 101A uses the short range wireless transceiver 103 to communicate with various devices, such as the wireless inductive charging device 144.

As an example, the short range wireless transceiver 103 includes a communication chip 115 to communicate with other systems with compatible protocol/transceivers. The chip may include a receiver, a voltage controlled oscillator (VCO), digital signal processor (DSP), analog to digital converter (ADC), amplifier, etc., (components not shown). The short range wireless transceiver 103 may further include a pairing circuit 119 configured to match or pair the mobile device 101A to another short range wireless transceiver (e.g., Bluetooth enabled device). Pairing includes determining compatibility and authorization between the protocols of two short range communication devices.

In an example, the mobile device 101A is paired with the wireless inductive charging device 144 via Bluetooth. In this regard, pairing establishes a trusted relationship between the mobile device 101 and the wireless inductive charging device 144. Although a user might opt to be prompted to enter a passkey every time a pairing is to be established, it is possible to have the passkey stored in the pairing circuit 119 for automatic connections.

The short range wireless transceiver 103 includes an antenna 117 configured to send and receive (e.g., Bluetooth, WiFi, ZigBee, etc.) data as over-the-air radio signals. For Bluetooth operations, the short range wireless transceiver 103 streams data via the antenna 117 for over the air transmission from the mobile device 101A, in this example, for communication with the wireless inductive charging device 144. It will be appreciated that the short range wireless transceiver 103 and antenna 117 may be used for other purposes.

The inductive charging system 105 is configured to inductively charge the battery 109 through the battery charging circuit 109b when coupled to a charging device, such as the wireless inductive charging device 144. The inductive charging system 105 includes an inductive pickup coil 123 configured to convert an alternating electromagnetic field that intersects the inductive pickup coil 123 into an alternating electrical current. The frequency bands in which the inductive pickup coil 123 and the wireless communication elements 103, 107 operate are non-overlapping and non-interfering, and thus are able to be used for entirely different purposes. In an example, the chip 115 and the antenna. 117 transmit and receive wireless communications in a radio frequency band, the wide area communication system 107 communicates in one of the assigned public radio frequency communications bands, whereas the inductive pickup coil 123 receives energy at a comparatively low frequency (e.g., 150 kHz) for charging the battery 109. The frequency band in which the antenna 113 operates is non-overlapping and non-interfering with those of the inductive pickup coil 123 and antenna 117. Conversely, communications via the transceivers 103, 107, such as over Bluetooth are out-of-band relative to the low frequency inductive transfer to the coils 123, for charging the battery 109.

The inductive charging system 105 also includes power conversion circuitry 125 configured to convert the alternating current received via the coil 123 into direct current at appropriate current and/or voltage levels. The power conversion circuitry 125 provides the direct current into the battery charging circuit 109b, which is configured to charge the battery 109 in a regulated manner, such as at a rate that is appropriate for the battery 109 and so as to cease charging the battery 109 after the battery is fully charged.

The wireless inductive charging device 144 includes inductive charger circuitry 146. The inductive charger circuitry 146 includes a tunable coil system (not shown in the first drawing) to inductively couple with the inductive pickup coil 123 of the inductive charging system 105 of the mobile device 101A. The inductive charging device 144 further includes a short range wireless transceiver 103B. The short range wireless transceiver 103B is similar to the short range wireless transceiver 103 of the mobile device 101A in that it includes a short range communication chip 115B, a matching (or pairing) circuit 119B, and an antenna 117B. The inductive charging device 144 additionally includes a power source 152 for driving the circuitry 146 and/or the short range wireless transceiver 103B. Although a battery or other power source may be used instead or in addition, the power source 152 often includes a circuit for coupling to alternating current (AC) power and mains, to convert the voltage and current drawn from the AC mains to voltage and current (typically direct current (DC)) appropriate for driving the elements of the wireless inductive charging device 144.

The short range wireless transceiver 103B is configured for short range wireless information communication (e.g., Bluetooth, ZigBee, WiFi) with the short range wireless transceiver 103 of the mobile device 101A. For example, information including power transfer configurations between the inductive pickup coil 123 and the tunable coil system, a target power transfer efficiency, adjustment settings for the inductive charger circuitry 146, distances between the devices, and the like, may be communicated via the wireless transceivers 103 and 103B.

The inductive charger circuitry 146 is configured to adjust power transfer settings of the tunable coil system, and in some examples, configured to make power transfer efficiency determinations. In one example, the inductive charger circuitry 146 includes functionality to determine a target power transfer efficiency between the inductive pickup coil 123 and the tunable coil system of the inductive charging device 144 and to adjust settings of the tunable coil system to approach the target power transfer efficiency. The circuitry 146 may include functionality to adjust the L/R/C values of the tunable coil system.

Those skilled in the art presumably are familiar with the structure, programming and operations of the various types of mobile devices. However, for completeness, it may be useful to consider the functional elements/aspects of an example of a mobile device 101B at a high-level.

Figure 1B:
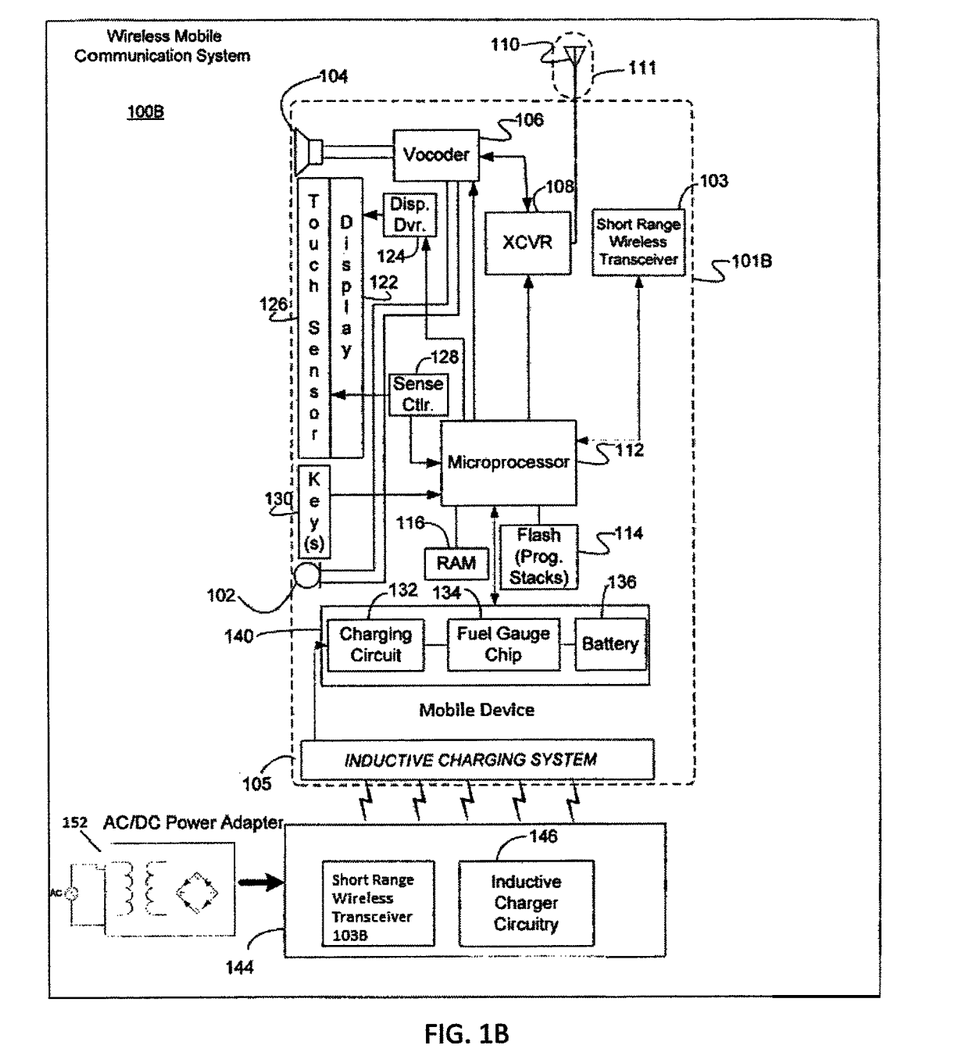

For purposes of such a discussion, FIG. 1B provides a block diagram illustration of an example of a touch type mobile device 101B. Although the mobile device 101B may be a tablet or may be incorporated into another device, such as a personal digital assistant (PDA) or the like, for discussion purposes, the illustration shows the mobile device 101B is in the form of a smart-phone type of handset. The handset example of the mobile device 101B functions as a normal digital wireless telephone station. For that function, the mobile device 101B includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (internet protocol) communications.

For digital wireless communications, the mobile device 101B may also include at least one digital transceiver (XCVR) 108. Today, the mobile device 101B would be configured for digital wireless communications using one or more of the common network technology types. The concepts discussed here encompass examples of the mobile device 101B utilizing any digital transceivers that conform to current or future developed digital wireless communication standards. The mobile device 101B may also be capable of analog operation via a legacy network technology.

The transceiver 108 provides two-way wireless communication of information, such a vocoded speech samples and/or digital information. The transceiver 108 also sends and receives a variety of signaling messages in support of the various voice and data services provided via the mobile device 101B and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 101B includes a display 122 for displaying messages, menus, or the like, call related information dialed by the user, calling party members, etc. The mobile device 101B also includes a touch/position sensor 126. The sensor 126 is relatively transparent, so that the user may view the information presented on the display 122. A sense controller 128 senses signals from elements of the touch/position sensor 126 and detects occurrence and position of each touch of the screen formed by the display 122 and sensor 126. The sense controller 128 provides touch position information to the microprocessor 122, which correlates that information to the information currently displayed via the display 122, to determine the nature of user input via the screen.

The display 122 and touch sensor 126 (and possibly one or more keys 130, if included) are the physical elements providing the textual and graphical user interface for the mobile device 101B. The microphone 102 and speaker 104 may be used as additional user interface elements, for audio input and output. Of course, other user interface elements may be used, such as a trackball, as in some types of PDAs or smart phone.

In addition to normal telephone and data communication related input/output (including message input and message display functions), the user interface elements also may be used for display of menus and other information to the user and user input of selections.

A microprocessor 112 serves as a programmable controller for the mobile device 101B, in that in controls all operations of the mobile device 101B in accord with programming that it executes, for all normal operations, and for operations involved in the communication with the inductive charging device 144 discussed herein. In the example, the mobile device 101B includes flash type program memory 114 for storage of various "software" or "firmware" program routines and mobile configuration settings, such as mobile director number (MDN) and/or mobile identification number (MIN), etc. In one example, the mobile device 101B includes a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software, a vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into an executed by the microprocessor 112.

The short range wireless transceiver 103 is configured to communicate with other wireless enabled devices. In this regard, mobile device 101B may be paired with an inductive charging device, such as wireless inductive charging device 144.

The mobile device 101B includes an inductive charging system 105. In one example, the inductive charging system 105 is coupled to a charging circuit 132, which ultimately provides charge to a rechargeable battery 136. A fuel gauge chip 134 is coupled between the battery 136 and the charging circuit 132. The fuel gauge chip determines the charge of the battery 136 and indicates when the battery 136 is charged. Once the battery 136 is charged, current to the battery 136 is cut off to prevent damage.

As outlined above, the mobile device 101B includes a processor 112, and application programs stored in the flash memory 114 configures the processor 112 so that the mobile device is capable of performing various desired functions, including in this case functions involved in the technique for communicating (e.g., providing data) to the inductive charging device 144 to enable the device 144 to adjust the tunable charge transfer to improve or optimize power transfer efficiency and/or to approach or achieve a target power transfer efficiency level.

The structure and operation of mobile devices 101A and 101B were described by way of example only. Mobile devices 101A and 101B may have additional or different components, and the components that have been described may perform additional or different functions.

The wireless inductive charging device 144 is configured to wirelessly charge appropriately equipped portable electronic devices, such as the mobile device 101. The charging device 144 includes a short range wireless transceiver 103B similar to system 103 discussed above. In an example, the short range wireless transceiver 103B includes a Bluetooth chip, a pairing circuit, and an antenna. The short range wireless transceiver 103B is configured to maintain a list of devices that have made successful connections in the past. It allows the pairing of a single mobile device at any given moment. For example, short range wireless transceiver 103B allows pairing with a mobile device that is within charging range of the inductive charging device 144.

Charging a battery wirelessly with resonant inductive coupling involves the transfer of power from a primary coil (the tunable coil system of the inductive charging device 144, for example) to a secondary coil (the inductive pick up coil 123 of the mobile device 101A, for example). For example, the primary coil may be a coil associated with a wireless inductive charging device (e.g., charging device 144) and the secondary coil may be a coil associated with a mobile device (e.g., inductive pickup coil of mobile device 101A and 101B). Wireless resonant inductive coupling typically allows for freedom of positioning between the primary coil and the secondary coil. However, the efficiency of the transfer of power from the primary coil to the secondary coil depends on a variety of factors and variables. The basic concepts of resonant inductive coupling and power transfer are described below, although one of skill in the art will recognize these concepts extend to advanced functionality of wireless resonant inductive coupling systems.

Figure 2:
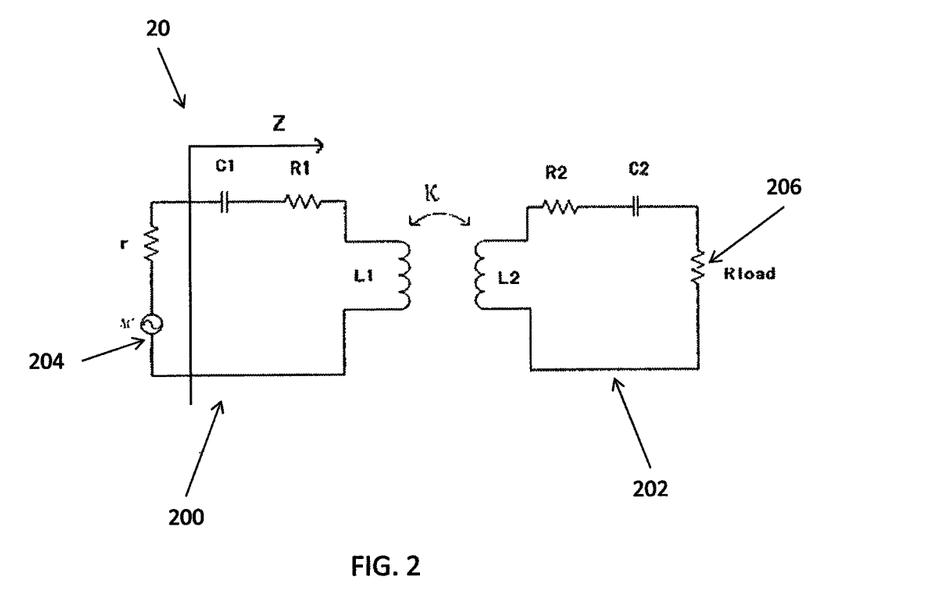
FIG. 2 is a circuit diagram generally depicting resonant inductive coupling.

A general resonant inductive charging system is shown in FIG. 2. The system 20 includes a first device 200 and a second device 202. The first device 200 has associated with it a primary coil L1, and the second device 202 has associated with it a secondary coil L2. The first device 200 also includes a resistor R1, a capacitor C1, and a power source 204. The second device 202 includes a resistor R2, a capacitor C2, and a resistive load 206. In a charging application, the load may be the battery charging circuitry of the chargeable device.

The coils L1 and L2 are separated at a spatial distance, and power can be transferred from coil L1 to coil L2 when the coils L1 and L2 are resonantly coupled (e.g., mutual induction) and an alternating current drive signal, e.g. at the resonant frequency, is applied to coil L1. In a resonant inductive coupled system, the coupling coefficient κ is the fraction of the magnetic flux of the primary coil L1 that is coupled to the secondary coil L2, and the coupling coefficient κ is a function of the geometry of the system 20 (e.g., the distance between the coils, the coil size, the coil alignment, etc.), where 0≤κ≤1. The Q factor of a resonant inductive coupled system represents how under-damped a resonator is, or characterizes the bandwidth relative to the center resonant frequency between the coils L1 and L2.

In a given system, the Q factor is represented by $$Q = \frac{1}{R}\sqrt{\frac{L}{C}}$$

The mutual inductance M is $$M = \kappa\sqrt{L_1 L_2}$$

With the primary coil and secondary coil at resonance, the equivalent impedance Z is $$Z = R_1 + \frac{\kappa^2 \omega^2 L_1 L_2}{R_2 + R_{load}}$$

From the above values, the power transfer to the second device 202 (Pload) from the first device 200 (Psource) and the efficiency η of the power transfer can be derived as $$P_{load} = P_{source}\left[1 - \left(\frac{Z-r}{Z+r}\right)^2\right]\eta = P_{source}\frac{4rZ}{(r+Z)^2}\eta$$

$$\eta = \frac{\frac{\kappa^2\omega^2 L_1 L_2}{R_2 + R_{load}}}{R_1 + \frac{\kappa^2\omega^2 L_1 L_2}{R_2 + R_{load}}} \times \frac{R_{load}}{R_2 + R_{load}} = \frac{\frac{R_{load}}{R_2}\frac{\kappa^2\omega^2 L_1 L_2}{R_1 R_2}}{\left(1 + \frac{R_{load}}{R_2}\right)\frac{\kappa^2\omega^2 L_1 L_2}{R_1 R_2} + \left(1 + \frac{R_{load}}{R_2}\right)^2}$$

For high efficiency, one would want high $\kappa^2\omega^2 L_1 L_2/R_1 R_2$, meaning high Q factor or κ for the coils, where ω is the resonant frequency. Strong coupling occurs when $\kappa^2\omega^2 L_1 L_2/R_1 R_2$ is >1, even with a low coupling coefficient κ.

Figure 3:
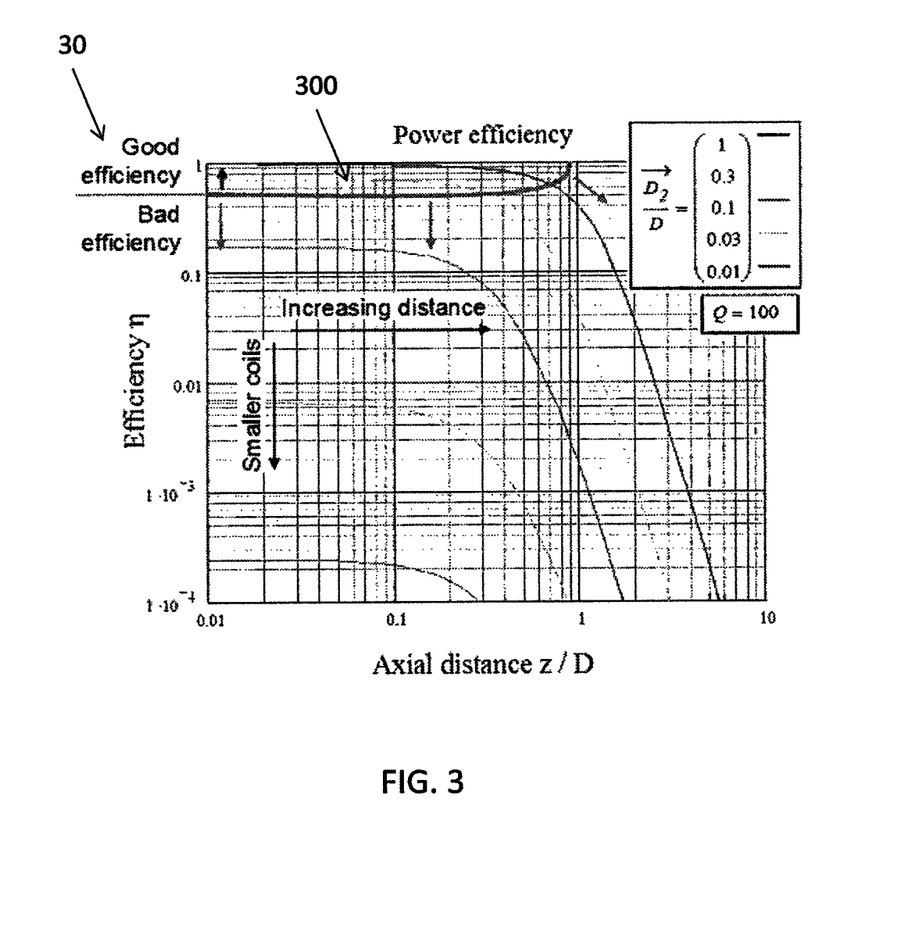
FIG. 3 is a graph depicting power transfer efficiency of an example of a resonant inductive coupled system.

The efficiency of power transfer may also depend on the axial distance between the primary coil and the secondary coil. FIG. 3 is a graph 30 representing efficiency of power transfer as a function of coil size, distance and axial distance in an example of a resonant inductively coupled system with a Q factor of 100. As can be recognized in FIG. 3, resonant inductive charging systems are typically tuned for a specific distance between the coils, as there is a specific range 300 that provides power transfer with a target efficiency level. The range of the efficient power transfer can depend on the resonance, the coil size, the coil orientation, the distance between the coils, etc. When the efficiency of power transfer is outside the specific range 300, most of the power that is emitted by the wireless inductive charging device is lost before it can be picked up by a secondary coil.

As used herein, a "target efficiency level" or "target power transfer efficiency" or the like refers to a level or value of the efficiency of power transfer between resonantly inductively coupled coils that is optimal or desirable for wirelessly charging batteries of mobile devices, given a set of factors (e.g., distance, L/R/C values, coil configuration, coil orientation, coil size, etc.) between the charging devices and the mobile devices. The target efficiency level may include a range of efficiency levels, such as a minimum level and a maximum level. While the disclosed systems and devices may achieve the maximum level of efficiency for a given set of factors, it is contemplated that the target efficiency level may not be achieved, or may not be maintained due to common interfering circumstances. Common interfering circumstances can include, for example, other wireless signals in the range of the charging device and/or mobile device, movement (e.g., rapid movement, movement out of range, etc.) of the mobile device and/or charging device, etc. Thus, the disclosed examples of systems and devices can be said to also approach a target efficiency level, or to improve the power transfer efficiency while not necessarily attempting to approach the target power transfer efficiency (e.g., improve power transfer efficiency when the target efficiency level cannot be achieved, improve power transfer efficiency while within a range of target efficiency levels, etc.). Additionally, in some circumstances, the power transfer efficiency is optimal or desirable, even though the efficiency does not reach a target level and cannot be significantly improved. As such, the optimal or desirable power transfer efficiency may represent the best efficiency for the given set of factors between the charging devices and the mobile devices, although the optimal or desirable power transfer efficiency may not result in the best conceivable efficient power transfer.

Thus, it is desirable to adjust the power emission from the wireless inductive charging devices such that power transfer efficiency between the primary coil and the secondary coil is improved or optimized with respect to a desired or target efficiency level. Due to the various factors upon which power transfer between coils in wireless resonant inductively coupled systems depend, it is advantageous to tune various parameters of the systems to improve the efficiency of the power transfer and approach a target power transfer efficiency for wirelessly charging of a battery of a mobile device. Examples of devices and systems for tuning between a mobile device and a wireless inductive charging device that are resonantly inductively coupled are disclosed below.

Figure 4:
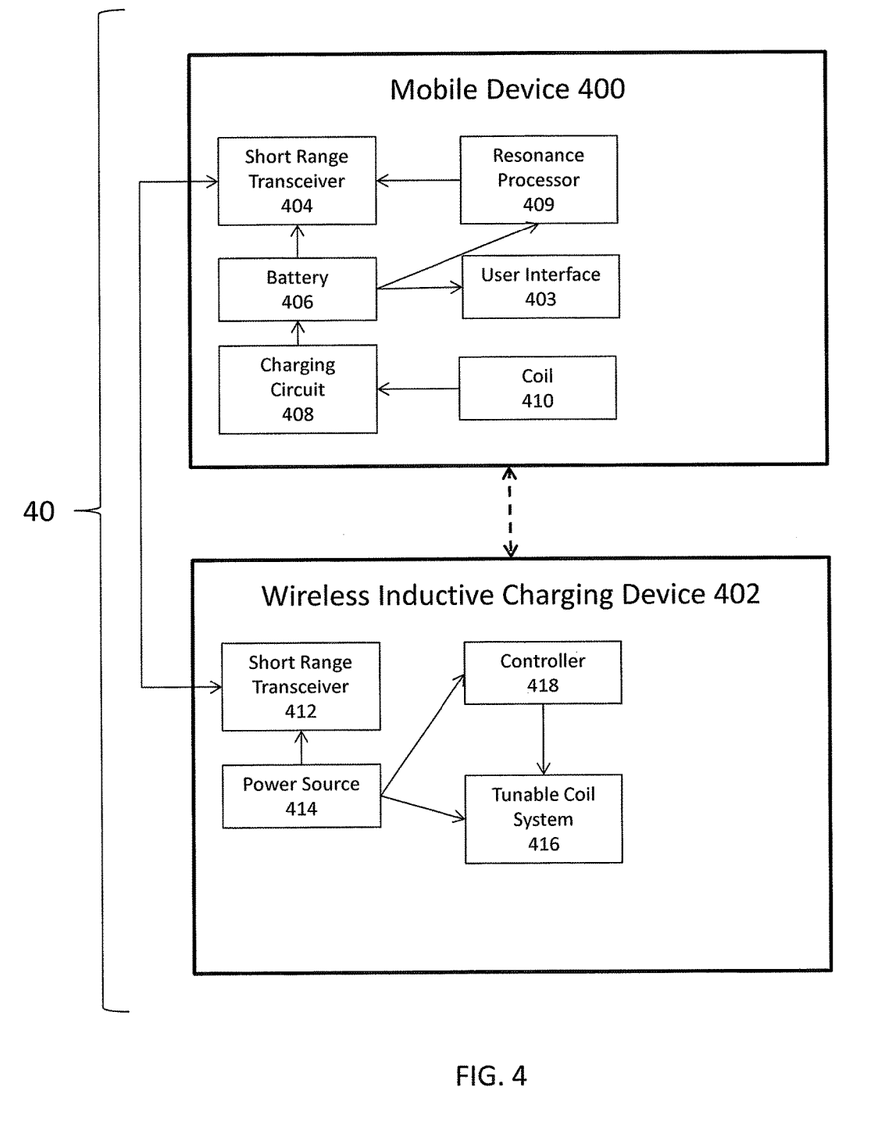
FIG. 4 is a functional diagram of an example of a mobile device and a wireless inductive charging device.

Referring to FIG. 4, a functional diagram of an example of a wireless resonant inductive charging system is shown. The system 40 includes a mobile device 400 and a wireless inductive charging device 402. The mobile device 400 includes a user interface 403, a short range transceiver 404, a battery 406, a charging circuit 408 in electronic connection with the battery 406, a resonance processor 409, and a coil 410. In an example, an arrangement of coils of various sizes (e.g., at least one smaller coil and at least one larger coil) and/or various orientations (e.g., a first coil perpendicular to a second coil, a first coil parallel to a second coil, etc.) is used instead of a single coil. The coil 410 may be tunable, such that the settings of the coil 410 (e.g., current, resistance, capacitance of the circuitry connected to the coil 410) may be adjusted. The coil 410 is coupled to the charging circuit 408. The coil 410 may be integrated to the mobile device 400, attached to the mobile device 400, etc. In an example, the coil 410 is connected to the mobile device 400 via a cable (e.g., USB, charging cable, etc.). The coil 410 may be part of a removeably attachable accessory, such as a dongle, a mobile device cover, etc. Other suitable coil couplings will be understood by one of skill in the art from the description herein.

The wireless inductive charging device 402 includes a short range wireless transceiver 412, a power source 414, a tunable coil system 416, and a controller 418 coupled to the tunable coil system 416. The tunable coil system 416 is configured for resonant inductive coupling with the coil 410 of the mobile device 400, such that power is transferred from the tunable coil system 416 to the coil 410 for wirelessly charging the battery 406 of the mobile device 400. The tunable coil system 416 may include a single coil. Alternatively, the tunable coil system 416 may include multiple coils of various sizes (e.g., at least one larger coil and at least one smaller coil). In another example, the tunable coil system 416 includes multiple coils set at various orientations, positions (e.g., parallel, perpendicular, etc.), and/or distances between the coils in addition to or instead of being of different sizes. The tunable coil system 416 may also include multiple coils arranged as a phase array. In an example, multiple coils are spaced out equally in a grid-like placement such that when more than one coil is transmitting power to a mobile device, the phase of the field transmitted from each coil can be synchronized (e.g., via communication between the coils, via set commands from the mobile device, etc.), resulting in each transmitted field being additive when received by the mobile device. The phase of the field transmitted may be synchronized utilizing time synchronization, selection and communication of a particular phase between the coils, detecting phase differences between coils with the mobile device and sending a signal to the coils to change settings of the coils to synchronize the phases, etc. The multiple coils may be integrated into a single wireless inductive charging device, or may be separately integrated into multiple independent wireless inductive charging devices.

The controller 418 is coupled to the tunable coil system 416 and is operable to adjust settings of the tunable coil system 416 to adjust the power transfer between the tunable coil system 416 and the coil 410 of the mobile device 400 so as to improve or optimize the efficiency of the power transfer and/or achieve/approach a target power transfer efficiency level. The settings that may be adjusted by the controller 418 include Q factor and/or coupling coefficient to adjust the resonance (e.g., adjusting the L/R/C values of the equations above, adjusting the frequency of the coil output, etc.), coil output to adjust the mutual inductance (e.g., activating a larger coil, activating a coil of a particular orientation, etc.), etc. In an example, the controller 418 is configured to operate a switch (e.g., a single pole double throw (SPDT) switch, a double pole double throw (DPDT) switch, etc.) to switch the power transmission from a first coil to a second coil. In such examples, the controller 418 is operable to switch between coils based on coil size, coil orientation, coil position, etc.

In one example, the wireless inductive charging device 402 communicates with the mobile device 400 via signals transmitted and received between the short range transceivers 404 and 412 in a communication channel that is out of band from the resonant inductive charging signal output from the charging device 402. In this example, the communication channel is configured for two way communication and may have a longer range (such as Bluetooth) than the resonant inductive charging signal output from the inductive charging device 402. Alternatively or additionally, the wireless inductive charging device 402 may communicate with the mobile device 400 in band with the resonant inductive charging signal.

The system 40 is configured to tune the resonant coupling between the tunable coil system 416 of the wireless inductive charging device 402 and the coil 410 of the mobile device 400, so as to improve or optimize the efficiency of power transfer from the tunable coil system 416 to the coil 410 and/or to approach or achieve a target power transfer efficiency level. The ability to tune the resonant coupling advantageously allows greater freedom of positioning of the mobile device 400 with respect to the wireless inductive charging device 402. The tuning of the resonant coupling is achieved in a variety of ways, as is disclosed below.

The resonant coupling may be tuned responsive to determinations related to power transfer efficiency, made by the mobile device 400 via, for example, by execution of application software downloaded to the mobile device 400. The resonance processor 409 of the mobile device may be configured to determine efficiency of power transfer between the mobile device 400 and the wireless inductive charging device 402. In an example, the tunable coil system 416 is active and is outputting the resonant inductive charging signal to the coil 410 (e.g., the mobile device 400 and the inductive charging device 402 are resonantly inductively coupled). The mobile device 400 determines, with the resonance processor 409, the efficiency of the power transfer between the coil system 416 and the coil 410. Once the power transfer efficiency is determined, the resonance processor 409 may determine if the efficiency is desirable, optimal, or needs improvement to charge the battery 406 by, for example, comparing the determined efficiency to a predefined target efficiency level, determining whether the battery 406 is actually receiving or is maintaining a charge, etc. In an example, the mobile device 400 is configured to indicate the power transfer efficiency to a user of the mobile device 400 via the user interface 403. The mobile device 400 may alert the user via the user interface 403 that the mobile device 400 is receiving and/or maintaining a charge, the mobile device 400 is not receiving and/or maintaining a charge, applications on the mobile device 400 should be shut down in order to improve the charging, etc. In an example, the mobile device 400 alerts the user via the user interface 403 to change the distance between the mobile device 400 and the charging device 402 to approach an efficient power transfer and/or improve the power transfer.

The inductive charging device 402 then sends a query signal to the mobile device 400 via the short range transceiver 412 and the mobile device 400 transmits a signal to the charging device 402 that indicates the power transfer efficiency. The charging device may be configured to send the query signal based on a predetermined time interval, a trigger signal from the mobile device 400, etc. If the power transfer efficiency is optimal and/or meets or exceeds the target efficiency level, the transmitted signal to the charging device 402 indicates the power transfer is sufficient and the settings of the tunable coil system 416 require no adjustment. If the determined power transfer is not optimal, can be improved, and/or is lower than the target efficiency level, the transmitted signal sent to the charging device 402 causes the charging device 402 to change a setting of the tunable coil system 416 to either improve the efficiency of the power transfer or approach the target power transfer efficiency level. The charging device 402 may adjust, via the controller 418, the Q factor, the coupling coefficient, the coil size activation, the coil orientation, and/or the resonant frequency in response to receiving the signal from the mobile device 400. The adjustments of the charging device 402 may be performed on a trial and error basis, and/or based on a predetermined adjustment algorithm. In an example, the charging device 402 is equipped with a processor (not shown) configured to calculate the proper adjustments in response to receiving the signal from the mobile device.

Once the setting is adjusted, the mobile device 400 determines the efficiency of the power transfer after the adjustment. In response to receiving another query signal from the charging device 402, the mobile device 400 transmits a signal indicative of the power transfer efficiency to the charging device 402. In this way, the above process may be repeated until the power transfer efficiency is optimal, meets or exceeds the target efficiency level, and/or cannot be further improved, to charge the battery 406.

In another example, the mobile device 400 is configured to determine a power transfer configuration that results in a power transfer efficiency that is optimal and/or meets or exceeds the target efficiency level from a given set of factors between the mobile device 400 and the wireless inductive charging device 402. As described above, the power transfer efficiency can depend on the distance between the coil 410 of the mobile device 400 and the tunable coil system 416 of the inductive charging device 402. The mobile device 400 may be configured to detect or determine the distance between the coil 410 and the coil system 416, and then, based on the determined distance, determine corresponding settings for the tunable coil system 416 that will achieve or approach an optimal power transfer efficiency or a target power transfer efficiency level.

Figure 5:
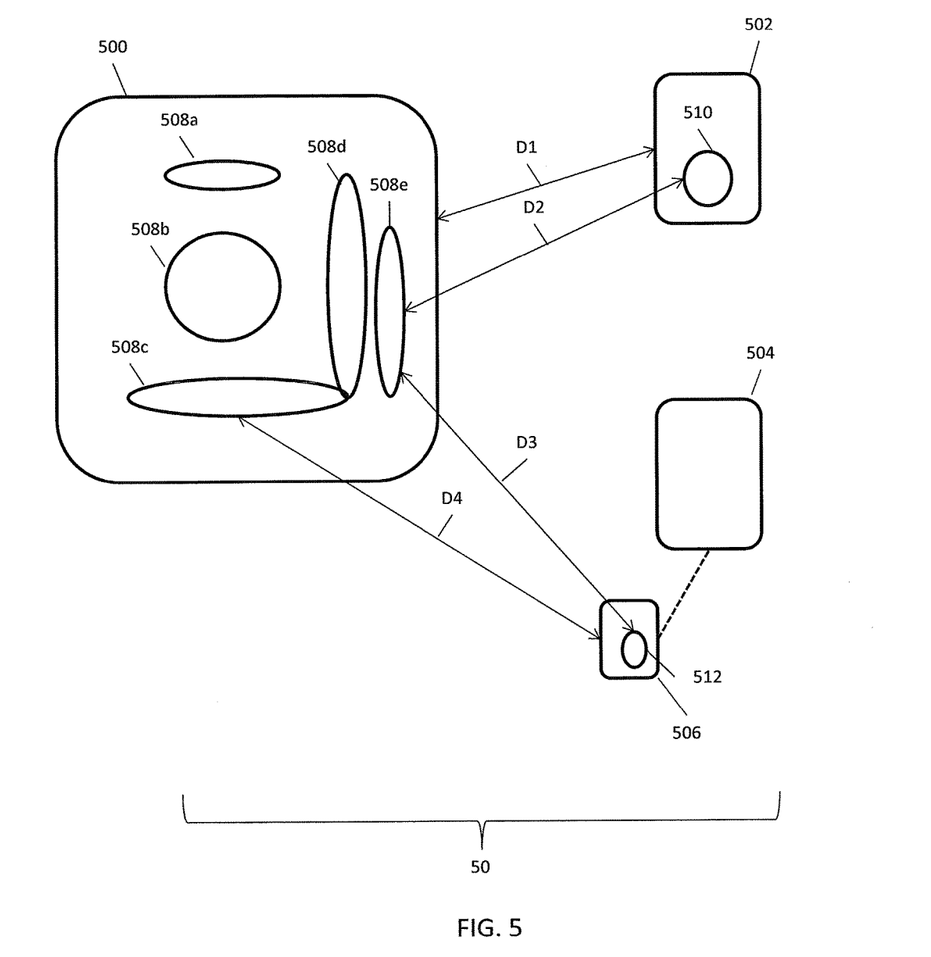
FIG. 5 is a functional diagram of an example of a wireless inductive charging device and mobile devices.

Referring to FIG. 5, examples of distances used to determine power transfer efficiency is shown. The system 50 includes a wireless inductive charging device 500, an mobile devices 502 and 504. The charging device 500 includes multiple inductive coils 508a-508e that are of various sizes, orientations, and distances from each other. The mobile device 502 includes an inductive pick up coil 510 integrated to the mobile device 502. The mobile device 504 is coupled to an accessory attachment 506 (e.g., via USB cable) that includes an inductive pick up coil 512. The inductive pick up coils 510 and 512 are configured to inductively couple to the coils 508a-508e of the wireless charging device 500 in order to wirelessly charge the respective mobile devices 502 and 504. Various lateral distances may be used by the systems to determine the particular coil(s) (e.g., 508a-508e) to use to transfer power, the settings of the coil(s) (e.g., coupling coefficient, Q factor, frequency, etc.), etc. For example, distance D1 is the lateral distance between outer perimeter of the mobile device 502 and the outer perimeter of the inductive charging device 500. The distance D2 is the distance between the inductive pick up coil 510 and the coil being used in the wireless charging device 500, coil 508e as depicted, such that the thicknesses of the mobile device 502 and the wireless charging device 500 are accounted for in such distance determinations. The distance D3 is the distance between the inductive pickup coil 512 and the coil be used in the wireless charging device 500, coil 508e as depicted, such that the thicknesses of the accessory attachment 506 and the wireless charging device 500 are accounted for in such distance determinations. The distance D4 is the distance between the outer perimeter of the accessory attachment 506 and the coil being used in the wireless charging device 500, coil 508c as depicted, such that the thickness of the wireless inductive charging device 500 is accounted for in such distance determinations, but the thickness of the accessory attachment 506 is not accounted for in such distance determinations. The optimal coil(s) to use in transmitting the inductive power signal may depend on one or all of the distance between coils, orientation of the coils, size of the coils, frequency of the coils, etc. The distances, devices, and coils depicted in FIG. 5 are exemplary and not exclusive. Those of skill in the art will understand various distances, devices, and coil positions and orientations may be utilized from the disclosure herein.

Referring back to FIG. 4, in an example, the mobile device 400 determines the distance between the coil 410 and the tunable coil system 416 by determining a round trip delay of a transmitted signal from the mobile device 400 to the charging device 402. In another example, the wireless inductive charging device 402 includes a transmitter (not depicted) from which a location signal is emitted and detected by the mobile device 400 and is used to determine, based on the information contained within the location signal (e.g., positional data, transmission cycle time, etc.), the distance between the coil 410 and coil system 416.

Once the mobile device 400 determines the corresponding settings for the tunable coil system 416 from the distance, the mobile device 400, via the short range transceiver 404, then sends a signal to the wireless inductive charging device 402, causing the charging device 402 to adjust the power transfer by changing the settings of the tunable coil system 416 to the determined settings. In an example where the mobile device 400 determines the distance between the coil 410 and the tunable coil system 416 is large and the tunable coil system 416 has coils of various sizes, the signal may cause the charging device 402 to adjust the power transfer by switching to larger coils in the tunable coil system 416. In an example where the mobile device 400 determines the distance between the coil 410 and the tunable coil system 416 is small, the signal may cause the charging device 402 to adjust the power transfer by switching to smaller coils in the tunable coil system 416.

The mobile device 400 may be configured to receive a plurality of power transfer configurations (e.g., power transfer settings from a single coil system, power transfer settings from a multiple coil system, etc.) from the wireless inductive charging device 402, and determine which of the plurality of power transfer configurations provides a power transfer efficiency that is optimal and/or that meets or exceeds a target efficiency level. For example, the mobile device 400 can send a start-up signal to the inductive charging device 402. Upon receiving the start-up signal, the wireless inductive charging device 402 enters a tune-up mode and cycles through multiple power transfer configurations by changing settings of the tunable coil system 416. In an example, the wireless charging device 402 is put into the tune up mode manually (e.g., a button on the charging device 402). The mobile device 400 receives each of the power transfer configurations and determines the efficiency of power transfer for each of the configurations via the resonance processor 409, for example. The mobile device 400 then determines which of the power transfer configurations has an efficiency that meets or exceeds a target power transfer efficiency level and/or results in an optimal efficiency.

In one example, the mobile device 400 determines which of the power transfer configurations has the highest efficiency of power transfer (e.g., when the target efficiency level cannot be met, the optimal efficiency cannot be met, when multiple power transfer configurations have efficiencies that meet or exceed the target power transfer efficiency level, etc.). In any event, the mobile device 400 determines which of the power transfer configurations is desirable for the tunable coil system 416. The mobile device 400 then transmits a command to the wireless inductive charging device 402 that causes the charging device 402 to set to the determined power transfer configuration. The mobile device 400 and/or the wireless inductive charging device 402 may utilize a separate set of transceivers (not shown) for exchanging the power transfer configurations, start-up commands, and/or set commands.

The resonant coupling may also be tuned by power transfer efficiency determinations made by the wireless inductive charging device 402. For example, the wireless inductive charging device 402 may be equipped with proximity/transponder sensors (not shown) capable of detecting the position or an approximate position of the mobile device 400 and/or the coil 410 with respect to the charging device 402. In another example where the mobile device 400 and the wireless charging device 402 communicate via Bluetooth, the wireless charging device 402 is configured to determine an approximate range or distance of the mobile device 400 with respect to the charging device 402 using the power of the Bluetooth transmission and the round trip delay of a Bluetooth signal. By approximating the range of the mobile device 400, the wireless charging device 400 can reduce an area to be searched with the proximity/transponder sensors and determine the distance to the mobile device 400 faster, allowing for a quicker tuning of the inductive charging device when the mobile device 400 is within range of the charging device 402. Based on the distance/location detection, the charging device 402 may determine, using the distance between mobile device 400 and the charging device 402 (or the coil 410 and the tunable coil system 416), a power transfer configuration of the tunable coil system 416 that meets or exceeds the target power transfer efficiency level, or is optimal based on the distance and/or other factors between the mobile device 400 and the charging device 402.

Although the functionality of the mobile device 400 and the wireless inductive charging device 402 for resonant inductive coupling is disclosed by the examples above, it is contemplated that alternative configurations are capable of charging the battery 406 via wireless resonant inductive coupling. For example, the wireless inductive charging device 402 may be equipped with a resonance processor that functions similar to the resonance processor 409 of the mobile device 400, such that the wireless inductive charging device 402 can make distance determinations, power transfer efficiency determinations, power transfer configuration determinations, etc. In another example, both the mobile device 400 and the wireless inductive charging device 402 utilize a tunable coil system similar to the tunable coil system 416, such that power transfer efficiency approached or achieved through changing settings of the tunable coil systems in both the mobile device 400 and the charging device 402. The mobile device 400 may optionally include proximity sensors for detecting the position of the wireless charging device 402, such that the distance between the mobile device 400 and the wireless charging device 402 may be determined from the location information detected by the proximity sensors for determining efficient power transfer configurations of the charging device 402.

The wireless charging devices disclosed herein may also be configured to inductively couple to multiple mobile devices simultaneously. As an example, an area may include a cell phone, a laptop computer, and a tablet computer, each with a coil coupled to the corresponding batteries. The wireless inductive charging device may include multiple tunable coil systems, such that multiple power transfer configurations can be achieved simultaneously. Alternatively, the wireless inductive charging device may be configured to determine a single power transfer configuration with a target efficiency level or that is optimal for charging all the batteries within the charging area.

Referring to FIGS. 6A-6D, examples of multiple wireless inductive charging devices operating on a network for wireless resonant inductive charging of mobile device batteries is shown. The system/network 60, as shown, includes three wireless inductive charging devices 600, 602, 604 that operate on a network (e.g., a mesh network, Bluetooth, ZigBee, etc.), with the devices 600, 602, and 604 configured for communication between the devices 600, 602, 604. The wireless inductive charging devices 600, 602, 604 function similar to the wireless inductive charging devices 144 and 402 described above, in that the devices 600, 602, 604 each include a tunable coil system for wireless resonant inductive coupling with a coil of a mobile device, a short range transceiver, etc. The wireless inductive charging devices 600, 602, and 604 are also configured for auto-tuning as disclosed above with respect to devices 144 and 402, such that the devices 600, 602, and 604 adjust power transfer configurations by changing settings of the tunable coil systems to achieve or approach a target power transfer efficiency level or an optimal power transfer efficiency for charging of batteries of mobile devices. In an example, the devices 600, 602, and 604 are in communication and exchange information relating to resonant coupling with mobile devices entering the network 60 (e.g., range and location of a mobile device, power transfer configurations, power transfer efficiency, etc.).

Figure 6A:
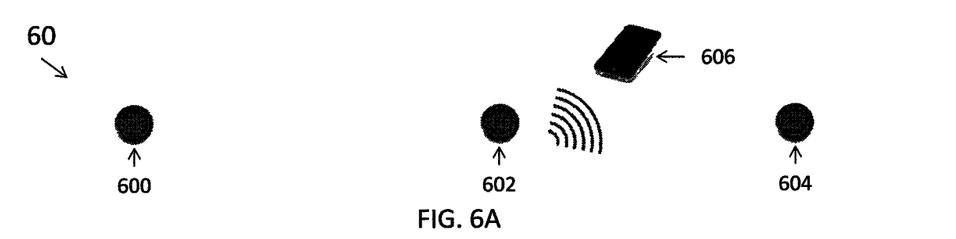
FIGS. 6A, 6B, 6C, and 6D depict examples of wireless charging networks.

As seen in FIG. 6A, the device 602 is resonantly coupled to the mobile device 606 that entered the network 60 of wireless inductive charging devices 600, 602, and 604. Although only three charging devices are depicted, it is contemplated that any number of charging devices may be utilized in the following examples. The mobile device 606 may be coupled to the charging device 602 based on a power transfer efficiency determination, in that the charging device 602 is capable of achieving the most efficient power transfer (as compared to devices 600 and 604) for charging the battery of the mobile device 606. In an example, the efficiency determination is made by the mobile device 606 (e.g., with a software application downloaded to the mobile device 606), and the mobile device 606 sends a corresponding signal to the charging device 602 to cause the charging device 602 to couple with the mobile device 606 and/or change settings of the tunable coil system of the charging device 602 to achieve the determined power transfer efficiency. Alternatively, the efficiency determination may be made by the charging device 602, or a combination of all charging devices in the network 60.

Figure 6B:
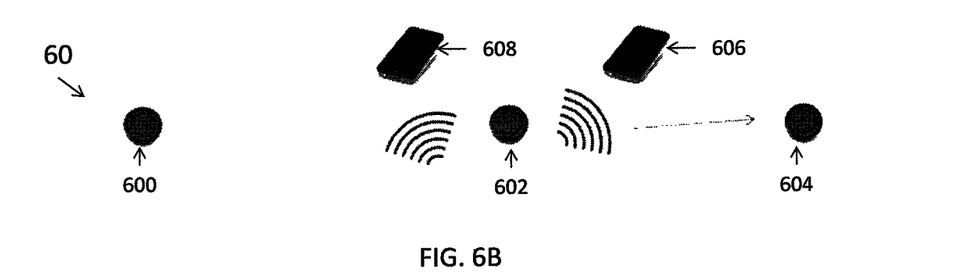

In FIG. 6B, a second mobile device 608 enters the network of chargers. Based on power transfer efficiency determination made by either the mobile devices 606 and 608, the charging devices 600, 602 and 604, or a combination of the devices, the mobile device 608 is resonantly coupled to the wireless inductive charging device 602. In an example, each of the charging devices 600, 602, and 604 determine an optimal power transfer efficiency between the charging devices 600, 602, 604, and mobile devices 606, 608 when the mobile device 608 enters the network 60.

Figure 6C:
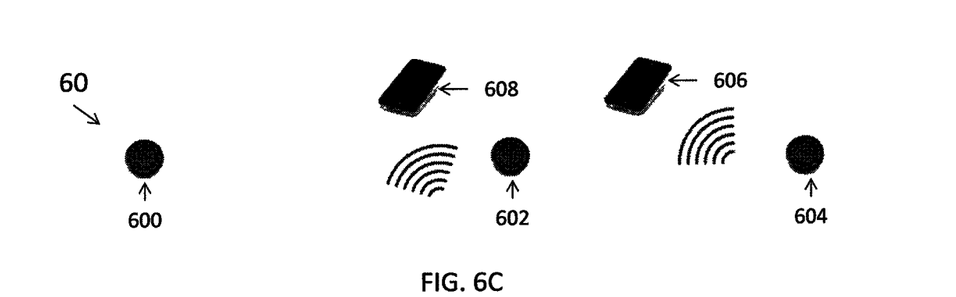

In one example, the charging devices 600, 602, and 604 are configured to transfer mobile devices from being coupled to one charging device to being coupled to another charging device, based on a power transfer efficiency determination. As depicted in FIG. 6B, the wireless inductive charging device 602 sends a transfer signal to the wireless inductive charging device 604. As shown in FIG. 6C, this transfer signal causes the mobile device 606 to decouple from the wireless charging device 602 and then resonantly couple to the wireless inductive charging device 604. In such an example, the charging devices 600, 602, 604, and/or the mobile devices 606, 608 determined that power transfer in the network 60 is more efficient when the mobile device 606 is coupled to the wireless charging device 604 and the mobile device 608 is coupled to the wireless inductive charging device 602. Alternatively, the wireless mobile charging devices 600, 602, and 604 may transfer a mobile device to another charging device in the system 60 for reasons other than power transfer efficiency, such as thermal problems, signal interferences, etc.

Figure 6D:
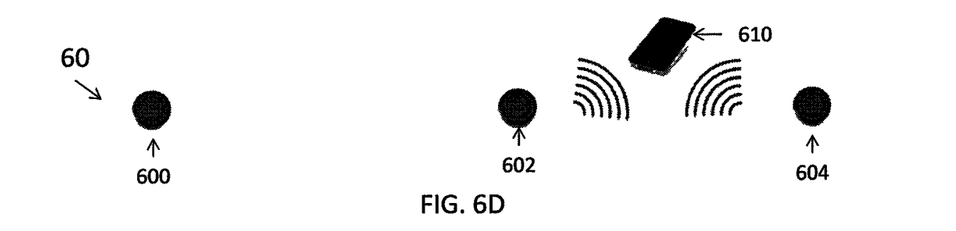

In another example depicted in FIG. 6D, the system 60 may determine an optimal power transfer efficiency that results in multiple charging devices coupling to a single mobile device. In the example, the power transfer configuration that meets a target efficiency level, or is optimal requires both the charging device 602 and the charging device 604 to couple to the mobile device 610. Such examples are advantageous in situations where the power transfer from one charging device is insufficient to achieve an optimal efficiency or a target efficiency level due to position of the mobile device 610, specifications of the coil of the mobile device 610, other devices on the network, etc. The phase of the emitted inductive magnetic fields of the charging devices 602 and 604 may be in synchronization due to communication between the charging devices 602 and 604.

In the disclosed networks, such as network 60, or with the wireless inductive charging devices 144 and 402, a priority system may be utilized to prioritize resonant coupling between the charging devices and the mobile devices. For example, a mobile device may have an identification associated with the device. The identification can include information such as ownership of network, subscriber/purchaser of a particular service, device type, etc. Upon entering the network, or entering range with a wireless inductive charging device, the mobile device sends an identification signal that includes the identification associated with the mobile device. The identification signal may be transmitted in band through the inductive resonant channel (e.g., the resonant inductive charging signal) of the charging devices, or out of band via Bluetooth, ZigBee, WiFi, etc.

The network or the charging device receives the identification signal, and may be configured to tune to the efficient power transfer configuration based on the priority associated with the identification signal. For example, a first mobile device may enter a network that gives priority to the owner of the network, and the identification associated with the first mobile device associates the device with the owner of the network. Upon receiving the identification signal, the network or the charging device is configured to tune to the efficient power transfer configuration determined for the first mobile device. When additional mobile devices enter the network, the charging devices will not tune to the efficient power transfer configuration of the additional mobile devices if the identification associated with the devices does not associate the device with the owner of the network. As such, the network gives priority to the owner of the network. In such examples, when the first device exits the range of the network, the charging devices may tune to the efficient power transfer configurations for the other mobile devices in the network, as no other devices in the system are associated with the priority of the network. In one example, the charging device includes multiple coil configurations and/or subsets of coils, such that one coil configuration/subset is reserved for mobile devices 400 associated with a particular wireless network and the other coil configuration(s)/subset(s) are generally open to devices associated with other wireless networks.

It is contemplated that multiple levels of priority associated with mobile devices may be utilized in the disclosed networks and wireless inductive charging devices (e.g., top priority, middle priority, low priority, no priority). For example, multiple priority levels may be associated with battery level of the mobile devices (e.g., lower battery level receives top priority, higher battery level receives lower priority, etc.). Top priority level may be associated with a premium payment on the account of the mobile device. As an example, a higher premium payment may receive top priority, a lower premium payment may receive middle priority, no premium payment may receive low priority, etc. In another example, a user of a mobile device obtains top priority through processing of a one-time payment to purchase top-priority. The priority levels may also be set based on device type. For example, a laptop computer may receive top priority, a tablet computer may receive middle priority, a smart phone may receive lower priority, etc. In examples where the inductive pick up coils are included in accessory attachments coupled to the mobile devices, priority may be set based on the brand/manufacturer of the accessory attachment. Additionally, priority may be set based on brand/manufacturer of the mobile device.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in, such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a battery;
   device electronics powered by the battery, including a mobile wireless communication transceiver and a short range transceiver;
   a charging circuit in electronic connection with the battery; and
   a coil coupled to the charging circuit, the coil configured for wireless resonant inductive coupling with a tunable coil system of a wireless inductive charging device and for charging the battery via the charging circuit when wirelessly coupled to the tunable coil system; and
   wherein the mobile device is configured to:
      determine a power transfer efficiency between the coil and the tunable coil system during the wireless resonant inductive coupling for the charging of the battery, and
      transmit to the wireless inductive charging device via the short range transceiver a signal to cause the wireless inductive charging device to increase power transfer by changing a setting of the tunable coil system to improve the power transfer efficiency between the coil and the tunable coil system when the determined power transfer efficiency is lower than a target efficiency level,
      a controller of the wireless inductive charging device changing the setting of the tunable coil system to improve the power transfer efficiency between the coil and the tunable coil system based on the signal,
         the changing of the setting of the tunable coil system including switching power transmission from a first coil of the tunable coil system to a second coil of the tunable coil system based on an orientation of the second coil to improve the power transfer efficiency.

2. The mobile device of claim 1, wherein the mobile device is further configured to transmit the signal to cause the wireless inductive charging device to change a coupling coefficient or a Q factor between the coil and the tunable coil system.

3. The mobile device of claim 1, wherein the mobile device is further configured to transmit and receive signals via the short range transceiver out of band from a resonant inductive charging signal transmitted from the wireless inductive charging device.

4. The mobile device of claim 1, wherein the mobile device is further configured to:
   inductively couple to the wireless inductive charging device with a plurality of power transfer configurations of the tunable coil system, and
   determine which of the plurality of power transfer configurations results in a power transfer efficiency that meets or exceeds the target efficiency level.

5. The mobile device of claim 4, wherein the mobile device is further configured to determine which of the plurality of power transfer configurations results in a power transfer efficiency that meets or exceeds the target efficiency level based on a distance between the mobile device and the wireless inductive charging device.

6. The mobile device of claim 1, wherein the mobile device is further configured to transmit a startup signal to the wireless inductive charging device, to cause the wireless inductive charging device to start and to transmit a resonant inductive charging signal from the tunable coil system to the coil of the mobile device.

7. The mobile device of claim 1, wherein the mobile device further comprises a user interface configured to indicate whether the determined power transfer efficiency is lower than the target efficiency level.

8. The mobile device of claim 1, wherein the mobile device further comprises a user interface configured to indicate a distance for the mobile device from the wireless inductive charging device to improve the power transfer efficiency between the coil and the tunable coil system when the determined power transfer efficiency is lower than the target efficiency level.

9. A wireless inductive charging device, comprising:
a power source;
a transceiver;
a tunable coil system configured for wireless resonant inductive coupling with a coil coupled to a battery of a mobile device and for resonantly inductively charging the battery when wirelessly coupled to the coil of the mobile device; and
a controller configured to adjust power transfer between the tunable coil system and the coil by changing a setting of the tunable coil system; and
wherein the wireless inductive charging device is configured to:
determine a target power transfer efficiency between the tunable coil system and the coil of the mobile device for charging of the battery, and
increase the power transfer between the tunable coil system and the coil by changing the setting of the tunable coil system to approach the determined target power transfer efficiency,
the controller changing the setting of the tunable coil system to approach the determined target power transfer efficiency,
the changing of the setting of the tunable coil system including switching power transmission from a first coil of the tunable coil system to a second coil of the tunable coil system based on an orientation of the second coil to improve a power transfer efficiency.

10. The wireless inductive charging device of claim 9, wherein the wireless inductive charging device is further configured to:
determine a distance between the wireless inductive charging device and the mobile device based on a signal received from the mobile device, and
determine the setting of the tunable coil system that approaches the determined target power transfer efficiency based on the determined distance, and
implement the increase of the power transfer via the controller by changing the setting of the tunable coil system to the determined setting.

11. The wireless inductive charging device of claim 10, wherein:
the tunable coil system comprises a plurality of coils of different sizes,
the plurality of coils including the first coil and the second coil; and
the controller is configured to increase the power transfer by changing an output of the tunable coil system to be from a coil of a particular size from among the coils of the tunable coil system as the determined setting based on the determined distance.

12. The wireless inductive charging device of claim 9, wherein the wireless inductive charging device is further configured to:
transmit a plurality of power transfer configurations to the mobile device, and
receive a signal from the mobile device indicating which of the power transfer configurations from the plurality of power transfer configurations approaches the determined target power transfer efficiency, and
increase, via the controller, the power transfer to the indicated power transfer configuration based on receiving the signal from the mobile device.

13. The wireless inductive charging device of claim 9, wherein the wireless inductive charging device is configured to change, via the controller, a coupling coefficient or a Q factor between the coil and the tunable coil system.

14. A mobile device, comprising:
a battery;
device electronics powered by the battery, including a mobile wireless communication transceiver and a short range transceiver;
a charging circuit in electronic connection with the battery; and
a coil coupled to the charging circuit, the coil configured for wireless resonant inductive coupling with tunable coil systems of wireless inductive charging devices and for charging the battery via the charging circuit when wirelessly coupled to tunable coil system; and
wherein the mobile device is configured to:
receive a first signal via the short range transceiver from a first wireless inductive charging device that is indicative of power transfer efficiency between the coil and a first tunable coil system of the first wireless inductive charging device,
receive a second signal via the short range transceiver from a second wireless inductive charging device that is indicative of power transfer efficiency between the coil and a second tunable coil system of the second wireless inductive charging device,
determine between which of the first wireless inductive charging device and the second wireless inductive charging device provides a power transfer efficiency that meets or exceeds a target efficiency level based on receiving the first signal or the second signal,
inductively couple the coil to the first tunable coil system or the second tunable coil system based on determining which of the first wireless inductive charging device or the second wireless inductive charging device provides the power transfer efficiency that meets or exceeds the target efficiency level, and
transmit, via the short range transceiver, a signal indicative of the power transfer efficiency that meets or exceeds the target efficiency level between the coil and either the first tunable coil system or the second tunable coil system, causing either the first wireless inductive charging device to increase a power transfer by changing a setting of the first tunable coil system, or the second wireless charging device to increase the power transfer by changing a setting of the second tunable coil system,
at least one of a first controller, of the first wireless inductive charging device, changing the setting of the first tunable coil system or a second controller, of the second wireless inductive charging device, changing the setting of the second tunable coil system to improve the power transfer efficiency between the coil and either the first tunable coil system or the second tunable coil system based on the signal, at least one of
the setting of the first tunable coil system or
the setting of the second tunable coil system
including at least a combination of two or more of:
a Q factor,
a coupling coefficient,
a coil size activation,
a coil orientation, or
a resonant frequency.

15. The mobile device of claim 14, wherein the mobile device is further configured to:
determine whether inductively coupling the coil to both the first tunable coil system and the second tunable coil system provides the power transfer efficiency that meets or exceeds the target efficiency level, and
inductively couple the coil to both the first tunable coil system and the second tunable coil system when the mobile device determines that inductively coupling to both the first tunable coil system and the second tunable coil system provides the power transfer efficiency that meets or exceeds the target efficiency level.

16. The mobile device of claim 14, wherein the mobile device is configured to determine the power transfer efficiency that meets or exceeds the target efficiency level based on a first distance between the coil and the first tunable coil system and a second distance between the coil and the second tunable coil system.

17. The mobile device of claim 14, wherein the mobile device is configured to:
transmit, an identification signal that includes an identification associated with the mobile device,
wherein at least one of the first wireless inductive charging device or the second wireless inductive charging device inductively couples to the mobile device and adjusts to the power transfer efficiency that meets or exceeds the target efficiency level when the identification is associated with a priority.

18. The mobile device of claim 17, wherein at least one of the first wireless inductive charging device or the second wireless inductive charging device adjusts to the power transfer efficiency that meets or exceeds the target efficiency level when the identification is associated with the priority that is based on a mobile network provider associated with the mobile device.

19. The mobile device of claim 14, wherein the mobile device is configured to:
transmit, an identification signal that includes an identification associated with the mobile device,
wherein at least one of the first wireless inductive charging device or the second wireless inductive charging device does not adjust to the power transfer efficiency that meets or exceeds the target efficiency level when the identification is not associated with apriority.

20. The mobile device of claim 14, wherein the mobile device is further configured to alert a user, via a user interface, to change a distance between the mobile device and the first wireless inductive charging device or the second wireless inductive charging device to increase the power transfer.

* * * * *